US012081466B2

(12) United States Patent
Morioka

(10) Patent No.: US 12,081,466 B2
(45) Date of Patent: Sep. 3, 2024

(54) TELECOMMUNICATIONS APPARATUS AND METHOD FOR SEARCHING A PREDEFINED SIGNATURE SEQUENCE

(71) Applicant: InterDigital Patent Holdings, Inc., Wilmington, DE (US)

(72) Inventor: Yuichi Morioka, Berkshire (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 346 days.

(21) Appl. No.: 14/389,809

(22) PCT Filed: Apr. 10, 2013

(86) PCT No.: PCT/GB2013/050914
§ 371 (c)(1),
(2) Date: Oct. 1, 2014

(87) PCT Pub. No.: WO2013/153376
PCT Pub. Date: Oct. 17, 2013

(65) Prior Publication Data
US 2015/0071205 A1    Mar. 12, 2015

(30) Foreign Application Priority Data
Apr. 11, 2012 (GB) .................................... 1206344

(51) Int. Cl.
*H04L 5/00* (2006.01)
*H04W 52/02* (2009.01)
*H04W 76/28* (2018.01)

(52) U.S. Cl.
CPC ............ *H04L 5/003* (2013.01); *H04L 5/0078* (2013.01); *H04W 52/0209* (2013.01); *H04W 76/28* (2018.02); *Y02D 30/70* (2020.08)

(58) Field of Classification Search
CPC ......... H04L 5/003; H04L 5/0078; H04L 5/00; H04W 52/0209; H04W 76/048;
(Continued)

(56) References Cited

U.S. PATENT DOCUMENTS 5,943,344 A    8/1999 Keller et al.
6,061,343 A  * 5/2000 son Åkerberg ...... H04B 7/2678
                                                     370/345
(Continued)

FOREIGN PATENT DOCUMENTS

CN    1256064    6/2000
CN    1389176    1/2003
(Continued)

OTHER PUBLICATIONS

Office Action dated Mar. 14, 2017, in European Patent Application No. 13 715 439.9.
(Continued)

*Primary Examiner* — Nizam U Ahmed
(74) *Attorney, Agent, or Firm* — Flaster Greenberg P.C.

(57) ABSTRACT

A wireless telecommunications system including at least one base station, a first terminal device and a second terminal device, wherein the first terminal device is a terminal device of a first type and the second terminal device is a terminal device of a second type, the second type being different from the first type, and wherein the at least one base station is configured to communicate data which is specific to the first terminal device in a synchronous manner and to communicate data which is specific to the second terminal device in a non-synchronous manner.

18 Claims, 7 Drawing Sheets

(58) Field of Classification Search
CPC ....... H04W 76/28; H04W 4/70; H04W 52/02; H04W 56/00; H04W 74/0883; Y02D 30/70
USPC .......................................................... 370/329
See application file for complete search history.

(56) References Cited

U.S. PATENT DOCUMENTS

| | | | | |
|---|---|---|---|---|
| 6,960,999 | B2* | 11/2005 | Haimovitch | G06K 7/10039 340/10.33 |
| 8,660,064 | B2 | 2/2014 | Lee et al. | |
| 9,036,652 | B2* | 5/2015 | Farhadi | H04W 52/0219 370/458 |
| 9,144,089 | B2* | 9/2015 | Li | H04W 74/0833 |
| 9,832,052 | B2* | 11/2017 | Stephens | H04L 27/0008 |
| 2002/0193945 | A1 | 12/2002 | Tan et al. | |
| 2006/0088060 | A1 | 4/2006 | Fujikami et al. | |
| 2007/0165567 | A1* | 7/2007 | Tan | H04J 13/004 370/329 |
| 2008/0043658 | A1* | 2/2008 | Worrall | H04W 72/005 370/312 |
| 2008/0056219 | A1* | 3/2008 | Venkatachalam | H04W 72/005 370/342 |
| 2008/0240028 | A1 | 10/2008 | Ding et al. | |
| 2009/0041246 | A1* | 2/2009 | Kitazoe | H04W 12/02 380/270 |
| 2009/0073944 | A1 | 3/2009 | Jiang et al. | |
| 2009/0172170 | A1* | 7/2009 | Rey | H04L 65/765 709/227 |
| 2009/0257421 | A1* | 10/2009 | Nakashima | H04W 74/0866 370/345 |
| 2009/0257425 | A1* | 10/2009 | Sastry | H04W 8/26 370/350 |
| 2010/0080181 | A1* | 4/2010 | Yamada | H04W 56/0005 370/329 |
| 2010/0080309 | A1* | 4/2010 | Moffatt | H04L 27/262 375/260 |
| 2010/0118777 | A1* | 5/2010 | Yamada | H04W 74/008 370/328 |
| 2010/0125453 | A1 | 5/2010 | Gibbs et al. | |
| 2010/0195607 | A1* | 8/2010 | Lee | H04W 74/0866 370/329 |
| 2010/0272007 | A1 | 10/2010 | Shen et al. | |
| 2010/0296436 | A1* | 11/2010 | Kwon | H04L 5/0092 370/328 |
| 2011/0007715 | A1* | 1/2011 | Kwon | H04L 23/02 370/335 |
| 2011/0013592 | A1* | 1/2011 | Uemura | H04W 24/10 370/331 |
| 2011/0105107 | A1* | 5/2011 | Kwon | H04W 28/06 455/422.1 |
| 2011/0110337 | A1 | 5/2011 | Grant et al. | |
| 2011/0150123 | A1* | 6/2011 | Han | H04B 7/18576 375/295 |
| 2011/0317655 | A1* | 12/2011 | Nakao | H04L 1/0027 370/329 |
| 2012/0039321 | A1* | 2/2012 | Ghosh | H04L 1/0025 370/338 |
| 2012/0040700 | A1* | 2/2012 | Gomes | H04W 68/00 455/500 |
| 2012/0099525 | A1 | 4/2012 | Maheshwari | |
| 2012/0099543 | A1 | 4/2012 | Lim et al. | |
| 2012/0163305 | A1* | 6/2012 | Nimbalker | H04W 52/0206 370/329 |
| 2012/0207099 | A1* | 8/2012 | Lindh | H04L 5/0039 370/329 |
| 2012/0275366 | A1* | 11/2012 | Anderson | H04W 52/0219 370/311 |
| 2013/0083753 | A1* | 4/2013 | Lee | H04W 72/0453 370/329 |
| 2013/0235779 | A1* | 9/2013 | Kang | H04L 1/1854 370/311 |
| 2013/0329654 | A1 | 12/2013 | Zakrzewski | |
| 2014/0098745 | A1* | 4/2014 | Balasubramanian | H04W 72/005 370/328 |
| 2014/0369287 | A1* | 12/2014 | Kim | H04L 25/0202 370/329 |
| 2015/0181560 | A1* | 6/2015 | Jamadagni | H04W 4/70 370/329 |

FOREIGN PATENT DOCUMENTS

| | | |
|---|---|---|
| CN | 102349341 B | 2/2014 |
| EP | 2 154 903 | 2/2010 |
| JP | 2001-526011 A | 12/2001 |
| JP | 2010-124492 A | 6/2010 |
| JP | 2011-118801 A | 6/2011 |
| WO | WO 98/52380 A1 | 11/1998 |
| WO | 2008 157839 | 12/2008 |

OTHER PUBLICATIONS

U.S. Appl. No. 14/388,603, filed Sep. 26, 2014, Morioka.
Japanese Office Action dated Nov. 22, 2016 in patent application No. 2015-505021.
Chinese Office Action dated Jun. 1, 2017 in Chinese Application No. 201380019446.2 (8 pages).
SA WG2 Meeting #85 S2-112339, "Synchronisation for triggering detached MTC devices" CATT, pp. 1-3, (May 16-20, 2011) XP 050525360.
3GPP TSG SA WG2 Meeting #83 TD S2-110673, "Triggering a detached MTC device", Interdigital Communications, pp. 1-4, (Feb. 21-25, 2011) XP 050523859.
3GPP TSG RAN WG1 #68 R1-120909, "Text proposal on reduction of maximum bandwidth for Section 6.2 of TR 36.888" Alcatel-Lucent(Rapporteur), Total 7 Pages, (Feb. 6-10, 2012) XP 050660965.
3GPP TSG RAN WG1 Meeting #68bis R1-121231, "On synchronized new carriers", Alcatel-Lucent, Acatel-Lucent Shanghai Bell, pp. 1-3, (Mar. 26-30, 2012) XP 050599525.
3GPP TSG RAN WG1 Meeting #68bis R1-121383, "On PSS/SSS for LTE Rel-11 New Carrier Type", Renesas Mobile Europe Ltd. Total 2 Pages, (Mar. 26-30, 2012) XP 050599670.
Holma, H., et al.. "LTE for UMTS OFDMA and SC-FDMA Based Radio Access", John Wiley and Sons, pp. 25-27, (2009).
ETSI TS 122 368 V10.5.0, Digital cellular telecommunications system (Phase 2+); Universal Mobile Telecommunications System (UMTS); LTE; Service requirements for Machine-Type Communications (MTC); Stage 1 (3GPP TS 22.368 version 10.5.0 Release 10), LTE Advanced. pp. 1-17, (Jul. 2011).
Written Opinion of the International Searching Authority dated Jul. 2, 2013 in PCT/GB13/050914 Filed Apr. 10, 2013.
Great Britain Search Report dated Aug. 16, 2012 in Application No. GB 1206344.2 Filed Apr. 11, 2012.
International Search Report dated Jul. 2, 2013 in PCT/GB13/050914 Filed Apr. 10, 2013.
Office Action dated Nov. 10, 2017 in Chinese Patent Appiication No. 201380019446.2 (With English Translation).

* cited by examiner

TELECOMMUNICATIONS APPARATUS AND METHOD FOR SEARCHING A PREDEFINED SIGNATURE SEQUENCE

CROSS-REFERENCE TO RELATED APPLICATIONS

The present application is based on PCT/GB13/50914 filed Apr. 10, 2013 and claims priority to British Patent Application 1206344.2, filed in the UK IPO on Apr. 11, 2012, the entire contents of each of which being incorporated herein by reference.

BACKGROUND OF THE INVENTION

The present invention relates to methods, systems and apparatus for transmitting data in mobile telecommunications systems.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing coverage. One such class of device are machine-type-communication (MTC) devices supporting machine-to-machine (M2M) communications. Examples include so-called smart meters which, for example, are located in a customer's house and periodically transmit information back to a central MTC server data relating to the customer's consumption of a utility such as gas, water, electricity and so on. Further information on characteristics of MTC-type devices can be found, for example, in the corresponding standards, such as ETSI TS 122 368 V10.530 (2011-07)/ 3GPP TS 22.368 version 10.5.0 Release 10) [2]. MTC devices may in some respects be seen as devices which can be supported by relatively low bandwidth communication channels having relatively low quality of service (QoS), for example in terms of latency.

Whilst it can be convenient for a terminal such as an MTC-type terminal to take advantage of the wide coverage area provided by a third or fourth generation mobile telecommunication network there are at present some disadvantages associated with the use of existing network configuration for communicating MTC data. The minimisation of power consumption and complexity is a driving factor behind all third and fourth generation terminals, and even more so for MTC terminals because of desired low cost and placement in locations where access to a dedicated power source may be limited or not economically viable. Consequently, there is a desire to reduce the power consumption of MTC terminals.

A technique which has been incorporated into LTE to help manage power consumption is the so-called discontinuous reception (DRX) mode. DRX allows a terminal to stay in a sleep mode between paging cycles with the network and therefore conserve power. This is achieved by extending the period of a paging cycle to a device and the device waking up for the duration of a predetermined wake-up window after a sleep period to receive any paging information. This process can help relieve the terminal of frequent synchronisation and communication tasks with the network and the reduced operating burden can lead to an associated reduction in power consumption. Thus the DRX capability included in LTE-type systems enables devices to be brought out of a power saving idle state and re-establish communications with the network when needed.

Whilst the DRX operating mode can help reduce power consumption for terminals which might access the network only infrequently, there are nonetheless a number of drawbacks with this approach. Firstly, the maximum DRX cycle currently specified is relatively short, only around 2.5 seconds. However, it is expected that some types of terminal, for example MTC-type devices, might wish to communicate data much less frequently than this such that a longer potential period of inactivity could be more appropriate in some circumstances. Secondly, when a terminal device wakes up in accordance with a conventional DRX operating mode, the device must perform a number of steps before it is able to determine if the network has data for communication to the device.

For example, when operating in a conventional DRX mode and a DRX timer expires (i.e. when it is time for device to "wake up"), a device will commonly be required to undertake the following steps to retrieve user data.

Step 1: Frame Synchronization. The device searches for synchronization signals to achieve frame synchronization Step 2: Reception of Master Information. The device determines the location of the Master Information Block (MIB) in the frame structure and decodes the MIB to determine channel bandwidth and System Frame Number (SFN) information.

Step 3: Reception of System Information. Taking account of SFN, the device determines the location of System Information Block(s) (SIB) in the frame structure and decodes SIB to obtain further system information Step 4: Reception of Paging Message. The device searches for paging information that would indicate the presence of user data for the device on the relevant control channel (PDCCH).

Thus as part of each DRX cycle the device checks specific frames and subframes for paging messages from the network, the locations of paging messages and the DRX cycle of a device having been pre-negotiated between the device and the network. When a relevant paging message is received by a device, the device establishes a data connection with the network using established signalling and proceeds to transmit/receive the relevant data. However, as set out above, for the device to be able to do this it needs to first perform various steps including synchronising with the network's frame structure.

In some cases a device may not be required to perform all the above-mentioned steps on every DRX cycle. For example, for short DRX cycles, frame synchronisation could in principle be maintained from one DRX cycle to the next with sufficiently accurate timing. Furthermore, information such as MIB/SIB may in principle be stored at the device and assumed the same in different DRX cycles such that some of the four steps set out above may be abbreviated. However, for relatively long DRX cycles it is likely to be necessary to re-obtain this information for at least some, if not most, DRX cycles.

Because a device will generally perform the above-identified steps (or an abbreviated version of them) for every DRX cycle, there can still be a significant amount of power required to operate in a DRX mode, even during extended periods when there is no data to be communicated to the device.

One existing low power, short-range ad-hoc network protocol designed for low data-rate applications is ZigBee®. It is a protocol designed for use with mesh networks and has the capability to forward messages between devices and for devices to sleep between periods of activity. To further conserve node battery life the transfer of data between a coordinator device and a receiving device is primarily controlled by the receiving device as opposed to the coordinator device. The protocol for transferring data from a coordinator device to a receiving device is dependent upon whether the ZigBee network is beacon or non-beacon enabled. In a beacon-enabled network, the coordinator device indicates in a beacon that it wishes to transfer data to a receiving device. A receiving device periodically wakes up from its sleeping state, receives and utilises the beacon for synchronisation, and then checks for relevant messages from the coordinator device. If one is found, the receiving device requests that the coordinator device sends the data. In a non-beacon-enabled network, a receiving device periodically wakes from a sleeping state and requests any pending data from the coordinator device. If there is pending data the coordinator device acknowledges the request for transmission and then sends the data. If there is no pending data the coordinator informs the device and the device responds with an acknowledgement. This protocol allows devices to sleep for significant periods of time, but requires a number of two-way transmissions between the devices and the coordinator to establish communications regardless of whether or not there is data to be communicated. Furthermore, these modes of operation depart significantly from established wireless telecommunications principles and so could not be readily implemented in a wireless telecommunications system, such as an LTE-type network.

Some other types of network which allows a device to enter a sleep period/power saving mode are those based on the IEEE 802.11 standard, for example WiFi. In these networks a device may enter a sleep mode and the network access point maintains a list of all the devices that are currently sleeping. A beacon frame that contains information on pending data for sleeping devices is then periodically transmitted by the access point. Sleeping devices wake up and check this frame to learn whether there is data pending; if data is pending the devices poll the access point and initiate communications with the access point. Communications between the device and access point can also be re-established by the device informing the access point that it has woken-up from a sleep period. Although this procedure allows a device to sleep for periods of time and therefore save power, they still have to wake up at pre-defined times to check the beacon frame and then perform a number of two-way communications to establish a link with the network. Consequently, devices need to maintain synchronisation with the network in order to utilise the power saving mode and when a device does emerge from the power saving mode it incurs significant overheads. Furthermore, and as with ZigBee, these operating aspects of schemes based on the IEEE 802.11 standard depart significantly from established wireless telecommunications principles and so could not be readily implemented in a wireless telecommunications system, such as an LTE-type network Thus although there are a number of established power saving techniques for devices which might infrequently receive only small quantities of data, there remains a need to provide improved schemes for reduced power operation for terminal devices operating in wireless telecommunications networks, for example MTC type devices operating in an LTE-type network.

SUMMARY OF THE INVENTION

In accordance with an aspect of the invention there is provided a wireless telecommunications system comprising at least one base station, a first terminal device and a second terminal device, wherein the first terminal device is a terminal device of a first type and the second terminal device is a terminal device of a second type, the second type being different from the first type, and wherein the at least one base station is configured to communicate data which is specific to the first terminal device in a synchronous manner and to communicate data which is specific to the second terminal device in a non-synchronous manner.

In accordance with some embodiments the at least one base station is configured to communicate data which is specific to the second terminal device in a non-synchronous manner only during time periods determined in accordance with a predefined timing schedule.

In accordance with some embodiments the at least one base station is configured to communicate data which is specific to the second terminal device in a non-synchronous manner using a predefined frequency range which is narrower than and within an operating frequency range for the at least one base station.

In accordance with some embodiments the data which is specific to the second terminal device comprises an indication of an identity of the second terminal device.

In accordance with some embodiments the data which is specific to the second terminal device comprises user-plane data for the second terminal device.

In accordance with some embodiments the data which is specific to the second terminal device comprises an indication of a coding scheme for the user-plane data for the second terminal device.

In accordance with some embodiments the data which is specific to the second terminal device comprises an indication of a time and/or frequency on which user-plane data for the second terminal device is transmitted by the at least one base station.

In accordance with some embodiments the at least one base station is configured to communicate data which is specific to the second terminal device in a non-synchronous manner by transmitting said data in association with a predefined signature sequence.

In accordance with some embodiments the at least one base station is configured to transmit the data which is specific to the second terminal device in a packet format for which the predefined signature sequence comprises a portion selected from the group comprising a pre-amble portion, a mid-amble portion, a post-amble portion, a pilot portion, and a scattered pilot portion.

In accordance with some embodiments the packet format further comprises a header portion comprising an indication of an identity of the second terminal device.

In accordance with some embodiments the packet format further comprises a payload portion comprising user-plane data for the second terminal.

In accordance with some embodiments the at least one base station is configured to communicate data which is specific to another terminal device in a non-synchronous manner by transmitting said data specific to said another terminal device in association with the predefined signature sequence.

In accordance with some embodiments the at least one base station is configured to communicate data which is specific to another terminal device in a non-synchronous manner by transmitting said data specific to said another terminal device in association with another predefined signature sequence.

In accordance with some embodiments the predefined signature sequence is one of a set of predefined signature sequences for use by the at least one base station for non-synchronously communicating data with terminal devices of the second type.

In accordance with some embodiments the predefined signature sequence is one of a subset of the set of predefined signature sequences, and wherein the base station is configured to select one of the subset of the set of predefined signature sequences to be used for non-synchronously communicating data with the second terminal device.

In accordance with some embodiments the second terminal device is configured to search transmissions from the at least one base station to identity the predefined signature sequence and to determine if an identified transmission of the predefined signature sequence is associated with data which is specific to the second terminal device.

In accordance with some embodiments the second terminal device is configured to transmit acknowledgement signalling to the at least one base station after successful receipt of the data which is specific to the second terminal.

In accordance with some embodiments the at least one base station is configured to transmit a radio frame structure including a control region for control data for terminal devices of the first type, and wherein the at least one base station is configured to communicate with the second terminal device at times and frequencies outside the control region for terminal devices of the first type.

In accordance with some embodiments the data which is specific to the second terminal device comprises an instruction for the second terminal device to proceed to synchronise to a frame structure transmitted by the at least one base station in order to receive further data synchronously.

In accordance with some embodiments the at least one base station is further configured to communicate data with the second terminal device in a synchronous manner.

In accordance with some embodiments the second type of terminal device is a machine-type communication, MTC, terminal device.

In accordance with some embodiments the wireless telecommunications system is based around a 3rd Generation Partnership Project, 3GPP, architecture.

In accordance with another aspect of the invention there is provided a method of operating a wireless telecommunications system comprising at least one base station, a first terminal device and a second terminal device, wherein the first terminal device is a terminal device of a first type and the second terminal device is a terminal device of a second type, the second type being different from the first type, the method comprising communicating data which is specific to the first terminal device in a synchronous manner and communicating data which is specific to the second terminal device in a non-synchronous manner.

In accordance with another aspect of the invention there is provided a base station for communicating data with a first terminal device of a first type and a second terminal device of a second type, the second type being different from the first type, wherein the base station is configured to communicate data which is specific to the first terminal device in a synchronous manner and to communicate data which is specific to the second terminal device in a non-synchronous manner.

In accordance with another aspect of the invention there is provided a method of operating a base station of a wireless telecommunications system for communicating data with a first terminal device of a first type and a second terminal device of a second type, the second type being different from the first type, wherein the method comprises communicating data which is specific to the first terminal device in a synchronous manner and communicating data which is specific to the second terminal device in a non-synchronous manner.

In accordance with another aspect of the invention there is provided a terminal device for receiving data from a base station in use in a wireless telecommunications system, wherein the terminal device is configured to receive data which is specific to the terminal device from the base station in a non-synchronous manner by searching a radio frame transmitted by the base station for a predefined signature sequence transmitted by the base station in association with the data which is specific to the terminal device, and extracting the data which is specific to the terminal device from the radio frame transmitted by base station based on an identification of the a predefined signature sequence.

In accordance with some embodiments the terminal device is configured to search for the predefined signature sequence only during time periods determined in accordance with a predefined timing schedule.

In accordance with some embodiments the terminal device is configured to enter a sleep mode at times outside the time periods during which it searches for the predefined signature sequence.

In accordance with some embodiments the terminal device is configured to enter a sleep mode in response to receiving the data which is specific to the terminal device.

In accordance with some embodiments the terminal device is configured to search for the predefined signature sequence within a predefined frequency range which is narrower than and within an operating frequency range of the wireless telecommunications system.

In accordance with some embodiments the data which is specific to the terminal device comprises an indication of an identity of the terminal device.

In accordance with some embodiments the data which is specific to the terminal device comprises user-plane data for the terminal device.

In accordance with some embodiments the data which is specific to the terminal device comprises an indication of a coding scheme for the user-plane data for the terminal device.

In accordance with some embodiments the data which is specific to the terminal device comprises an indication of a time and/or frequency on which user-plane data for the terminal device is transmitted by the base station.

In accordance with some embodiments the terminal device is configured to receive the data which is specific to the terminal device in a packet format for which the predefined signature sequence comprises a portion selected from the group comprising a pre-amble portion, a mid-amble portion, a post-amble portion, a pilot portion, and a scattered pilot portion.

In accordance with some embodiments the packet format further comprises a header portion comprising an indication of an identity of the terminal device.

In accordance with some embodiments the packet format further comprises a payload portion comprising user-plane data for the terminal device.

In accordance with some embodiments the predefined signature sequence is any one of a set of predefined signature sequences which the terminal device is configured to search for.

In accordance with some embodiments the terminal device is configured to transmit acknowledgement signalling to the base station after successful receipt of the data which is specific to the second terminal.

In accordance with some embodiments the data which is specific to the terminal device comprises an instruction for the terminal device to proceed to synchronise to the frame structure transmitted by the base station in order to receive further data in a synchronous manner, and wherein the terminal device is configured to do this in response to receiving the instruction to do so.

In accordance with some embodiments the terminal device is further configured to receive data from the base station in a synchronous manner.

In accordance with some embodiments the terminal device is a machine-type communication, MTC, terminal device.

In accordance with some embodiments the wireless telecommunications system is based around a 3rd Generation Partnership Project, 3GPP, architecture.

In accordance with another aspect of the invention there is provided a method of operating a terminal device in a wireless telecommunications system comprising searching a radio frame transmitted by a base station of the wireless telecommunications system for a predefined signature sequence transmitted by the base station in association with data which is specific to the terminal device and extracting the data which is specific to the terminal device from the radio frame transmitted by base station based on an identification of the predefined signature sequence, thereby receiving the data which is specific to the terminal device in a non-synchronous manner.

In accordance with another aspect of the invention there is provided an integrated circuit for use in a terminal device for receiving data from a base station in use in a wireless telecommunications system, wherein the integrated circuit comprises circuitry for causing the terminal device to receive data which is specific to the terminal device from the base station in a non-synchronous manner by searching a radio frame transmitted by the base station for a predefined signature sequence transmitted by the base station in association with the data which is specific to the terminal device, and extracting the data which is specific to the terminal device from the radio frame transmitted by base station based on an identification of the a predefined signature sequence.

It will be appreciated that features and aspects of the invention described above in relation to the first and other aspects of the invention are equally applicable and may be combined with the respective other aspects of the invention as appropriate.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Embodiments of the present invention are described herein with particular reference to an example implementation in a wireless communication system based around the 3GPP Long Term Evolution (LTE) standard. It will, however, be appreciated that embodiments of the invention may also be implemented in wireless telecommunications systems based on other standards having corresponding characteristics to those discussed below in the context of an LTE-type network.

Figure 1:
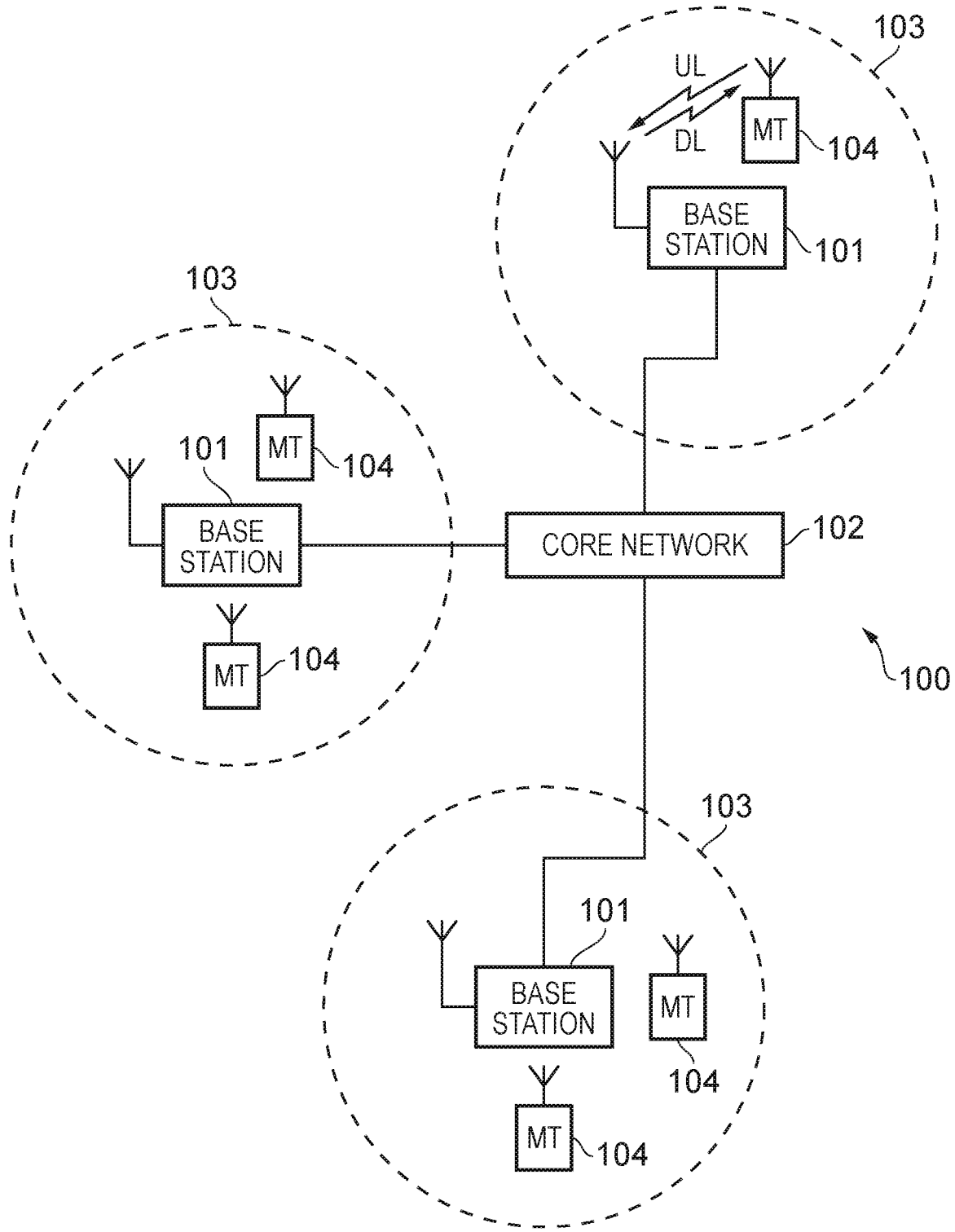
FIG. 1 is a schematic diagram illustrating a conventional mobile telecommunications system.

FIG. 1 provides a schematic diagram illustrating some basic functionality of a mobile telecommunications network/system 100 operating in accordance with LTE principles and which may be adapted to implement embodiments of the invention as described further below. Various elements of FIG. 1 and their respective modes of operation are well-known and defined in the relevant standards administered by the 3GPP® body and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as devices, terminals, mobile stations, user equipment (UE), user terminal, mobile radio, LTE devices and so forth. Base stations may also be referred to as transceiver stations/nodeBs/e-nodeBs, and so forth.

Figure 2:
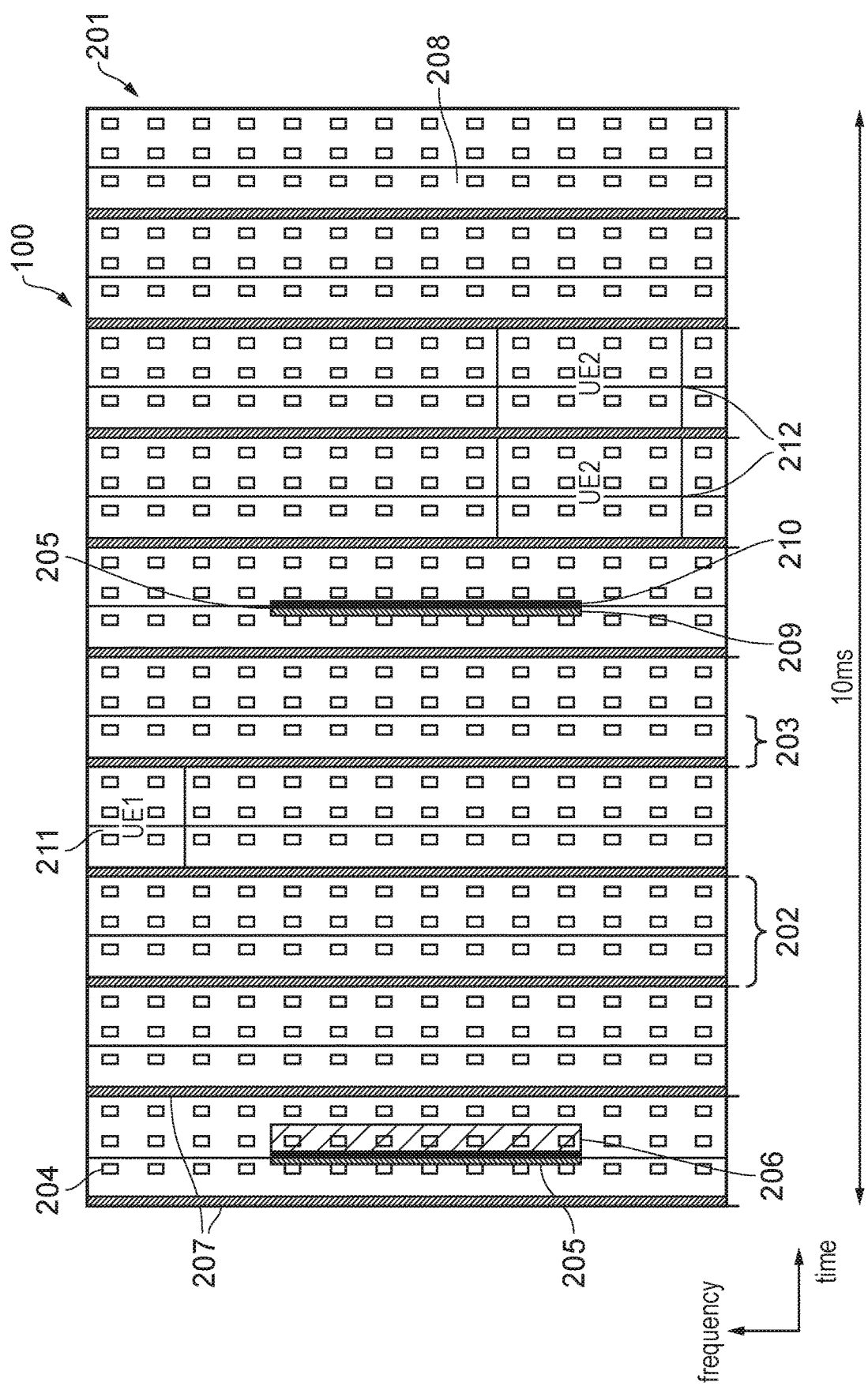
FIG. 2 is a schematic diagram illustrating a conventional LTE downlink radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single-carrier frequency division multiple access based interface for the radio uplink (so-called SC-FDMA). FIG. 2 shows a schematic diagram illustrating an OFDM-based LTE downlink radio frame 201. The LTE downlink radio frame is transmitted from an LTE base station (known as an enhanced Node B) and lasts 10 ms.

A downlink frame is made up of 10 subframes 202 each of which are composed of two slots 203. Each subframe comprises a predetermined number of symbols which are transmitted over a 1 ms period. Each symbol comprises a predetermined number of orthogonal sub-carriers distributed across the bandwidth of the downlink radio carrier.

The radio frame of FIG. 2 comprises various elements (represented not to scale in FIG. 2), such as reference symbols 204 interspersed throughout time and frequency, synchronisation signals 205 arranged across a central portion of the carrier bandwidth, a physical broadcast channel (PBCH) 206 arranged across a central portion of the carrier bandwidth, a control region 207 arranged across the full carrier bandwidth and including a physical control format indicator channel (PCFICH), a physical HARQ indicator channel (PHICH), and a physical downlink control channel (PDCCH), and a physical downlink shared channel (PDSCH) 208 arranged across the full system bandwidth.

Also schematically represented in FIG. 2 are some example resource allocations 211, 212 for two terminals UE1, UE2. For example, the resource allocation 211 for the first terminal (UE1) extends over a range of frequencies towards the top of the carrier bandwidth in the fourth subframe, while the resource allocation 212 for the second terminal (UE2) extends over a range of frequencies towards the bottom of the carrier bandwidth in the seventh and eighth subframes.

The reference symbols are uniformly distributed throughout the frame and are used for channel estimation, cell selection, handover etc.

Synchronisation signals are transmitted at the end of slots 1 and 11 of a frame and are made up of primary (PSS) 209 (schematically shown with hatching in FIG. 2) and secondary synchronisation (SSS) (schematically shown with heavy shading) synchronisation signals. As is conventional the synchronisation signalling 209, 210 is used by terminal devices to achieve frame synchronisation and determine the physical layer cell identity of the enhanced Node B transmitting the downlink signal.

The PBCH is allocated resources in the second slot of each radio frame and is used to broadcast the Master Information Block (MIB), which contains information on the downlink channel bandwidth.

Control channel data is transmitted in a control region of the subframe comprising the first n symbols of the subframe where n can vary between one and three symbols for channel bandwidths of 3 MHz or greater and where n can vary between two and four symbols for a channel bandwidth of 1.4 MHz. The data transmitted in the control region includes data transmitted on the PDCCH, the PCFICH and the PHICH. These channels transmit physical layer control information.

PDCCH contains control data indicating which sub-carriers of the subframe have been allocated to specific LTE terminals. This may be referred to as physical-layer control signalling/data. Thus, the PDCCH data transmitted in the control region of the fourth subframe shown in FIG. 2 would indicate that UE1 has been allocated the block of resources identified by reference numeral 211, and the PDCCH data transmitted in the control region of the seventh and eighth subframes would indicate the that UE2 has been allocated the respective parts of the block of resources identified by reference numeral 212 for the respective subframes. Although resource allocations for only two example devices are shown in FIG. 2, it will of course be appreciated that in general there will be more terminal devices receiving data on more (if not all) of the available PDSCH resources.

PCFICH contains control data indicating the size of the control region (i.e. between one and three symbols for channel bandwidths of 3 MHz or greater).

PHICH contains HARQ (Hybrid Automatic Request) data indicating whether or not previously transmitted uplink data has been successfully received by the network.

Data transmitted to individual LTE terminals on the PDSCH can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

Figure 3:
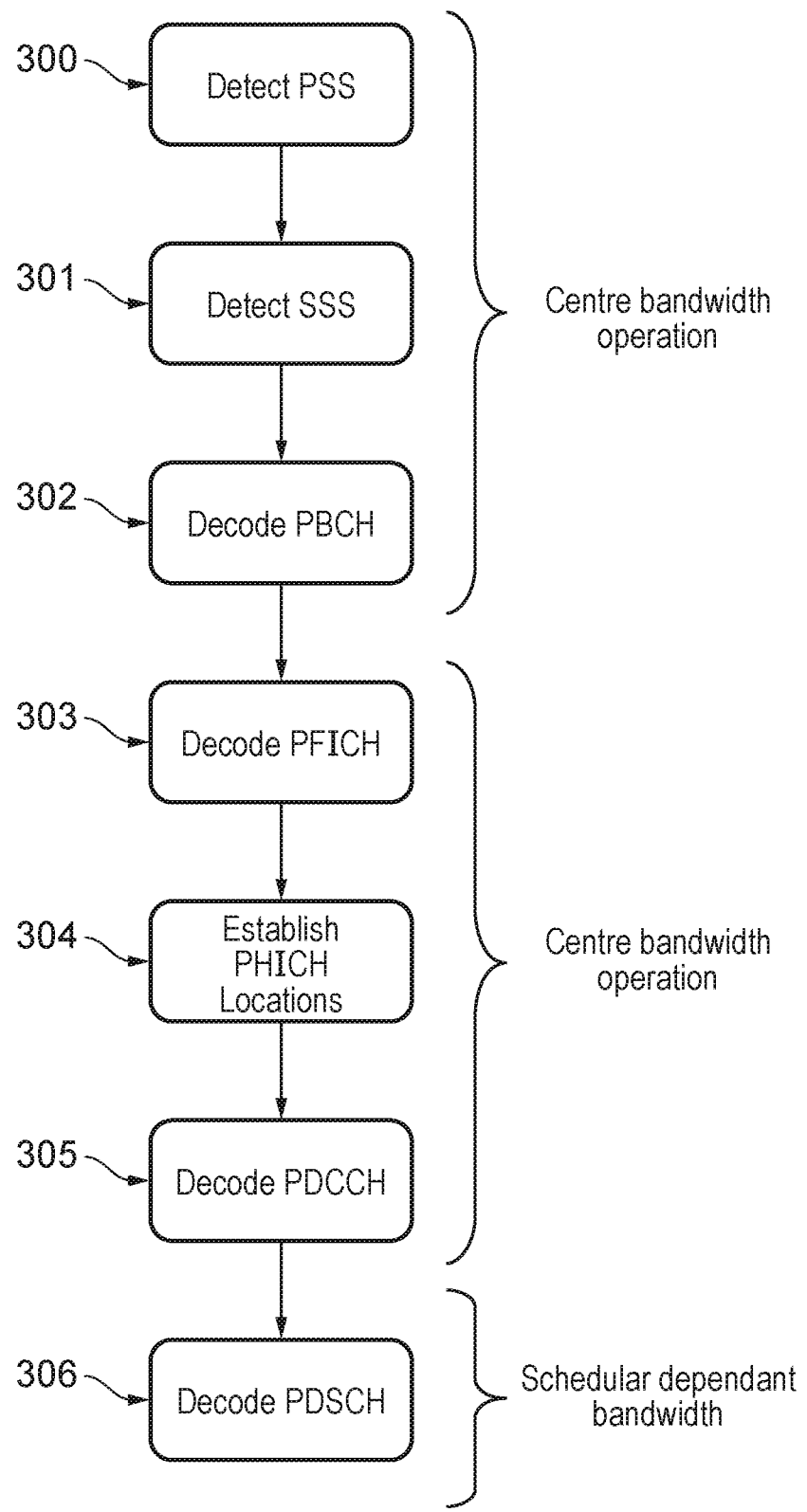
FIG. 3 is a schematic diagram illustrating a conventional LTE synchronisation and camp-on procedure.

FIG. 3 illustrates an LTE "camp-on" process, that is, the process followed by a conventional LTE-type terminal device (i.e. a device compliant with the current LTE standards) to allow the device to decode downlink transmissions which are sent by a base station via a downlink channel. Using this process, the terminal can identify the parts of the transmissions that include system information for the cell and thus decode configuration information for the cell.

As can be seen in FIG. 3, in the conventional LTE camp-on procedure, a terminal first synchronizes with the radio frame transmitted by a base station (steps 300 and 301) using the PSS and SSS in the centre band and then decodes PBCH (step 302). Once the terminal has performed steps 300, 301 and 302, it is synchronized with the base station and ready to begin decoding other physical channels.

For each subframe, the terminal then decodes the PCFICH which is distributed across the entire bandwidth of carrier (step 303). The terminal then ascertains the PHICH locations (step 304) and decodes the PDCCH (step 305), in particular for identifying system information transmissions and for identifying its personal allocation grants. The allocation grants are used by the terminal to locate system information and to locate its data on the PDSCH. Both system information and personal allocations are transmitted on PDSCH and scheduled within the carrier bandwidth. The terminal can then decode the PDSCH (step 306) which contains system information or data transmitted for this terminal.

As discussed above, a conventional LTE terminal device waking from a DRX sleep period will in general need to perform steps corresponding to at least some of those shown in FIG. 3. Furthermore, it may do this only to find there is not currently any data to be transmitted to the terminal device (i.e. there are no resource allocations for the terminal device or corresponding user-plane data on PDCCH/PDSCH). If there are no data to be received by the terminal device when it wakes up, undertaking the "wake-up" represents what is in effect a waste of the terminal device's resources, and in particular its available power. As noted above, the potentially unnecessary power consumption associated with waking up from a DRX cycle when there are no data to be received can be a particular problem for certain types of terminal device, for example machine type communication devices, whereas the approach of FIG. 3 may be a preferred approach for other types of terminal device, for example conventional terminal devices.

To address this issue, some embodiments of the invention propose an approach whereby a base station of a wireless telecommunications system is configured to communicate in a different manner with different types of terminal device. In particular, a base station may be configured to communicate data which is specific to a terminal device of a first type (e.g. a conventional terminal device) in a conventional synchronous manner (using the conventional synchronisation procedure discussed above), but to communicate data specific to a second terminal device of a second type (e.g. an MTC terminal device) in a non-synchronous manner (i.e. without using the conventional synchronisation procedure discussed above).

Figure 4:
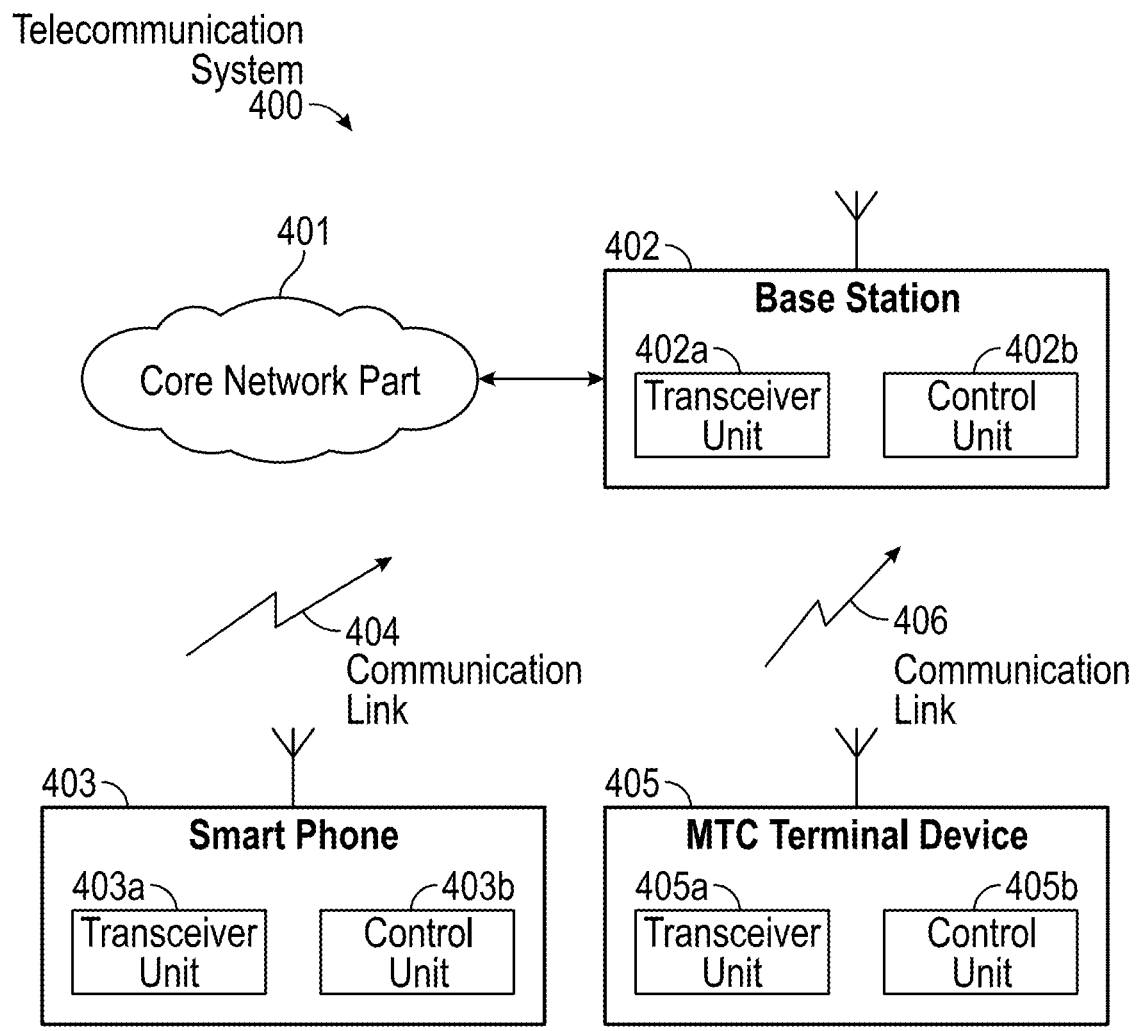
FIG. 4 is a schematic diagram illustrating a telecommunications system according to an embodiment of the present invention.

FIG. 4 schematically shows a wireless telecommunications system 400 according to a first example embodiment of the invention. The telecommunications system 400 in this example is based broadly on an LTE-type architecture. As such many aspects of the operation of the telecommunications system 400 are standard and well understood and are not described here in detail in the interest of brevity. Operational aspects of the telecommunications system 400 which are not specifically described herein may be implemented in accordance with any known techniques, for example according to the LTE-standards.

The telecommunications system 400 comprises a core network part (evolved packet core) 401 coupled to a radio network part. The radio network part comprises a base station (evolved-nodeB) 402, a first terminal device 403 and a second terminal device 405. It will of course be appreciated that in practice the radio network part may comprise a plurality of base stations serving a larger number of terminal devices across various communication cells. However, only a single base station and two terminal devices are shown in FIG. 4 in the interests of simplicity.

The terminal devices 403 and 405 are arranged to communicate data to and from the base station (transceiver station) 402. The base station is in turn communicatively connected to a serving gateway, S-GW, (not shown) in the core network part which is arranged to perform routing and management of mobile communications services to the terminal devices in the telecommunications system 400 via the base station 402. In order to maintain mobility management and connectivity, the core network part 401 also includes a mobility management entity (not shown) which manages the enhanced packet service (EPS) connections with the terminal devices 403 and 405 operating in the communications system based on subscriber information stored in a home subscriber server, HSS. Other network components in the core network (also not shown for simplicity) include a policy charging and resource function (PCRF) and a packet data network gateway (PDN-GW) which provides a connection from the core network part 401 to an external packet data network, for example the Internet. As noted above, the operation of the various elements of the communications system 400 shown in FIG. 4 may be broadly conventional apart from where modified to provide functionality in accordance with embodiments of the invention as discussed herein.

In this example, it is assumed the first terminal device 403 is a conventional smart-phone type terminal device communicating with the base station 402. Thus this first terminal device 403 comprises a transceiver unit 403a for transmission and reception of wireless signals and a controller unit 403b configured to control the smart phone 403. The controller unit 403b may comprise a processor unit which is suitably configured/programmed to provide the desired functionality using conventional programming/configuration techniques for equipment in wireless telecommunications systems. The transceiver unit 403a and the controller unit 403b are schematically shown in FIG. 4 as separate elements. However, it will be appreciated that the functionality of these units can be provided in various different ways, for example using a single suitably programmed integrated circuit. As will be appreciated the smart phone 403 will in general comprise various other elements associated with its operating functionality.

In this example, it is assumed the second terminal device 405 is a machine-type communication (MTC) terminal device operating in accordance with an embodiment of the invention. As discussed above, these types of terminal device may be typically characterised as semi-autonomous or autonomous wireless communication terminal devices communicating small amounts of data. Examples include so-called smart meters which, for example, may be located in a customer's house and periodically transmit information back to a central MTC server data relating to the customer's consumption of a utility such as gas, water, electricity and so on. MTC terminal devices may in some respects be seen as terminal devices which can be supported by relatively low bandwidth communication channels having relatively low quality of service (QoS), for example in terms of latency. It is envisaged that these kinds of device might be ubiquitously deployed without access to a permanent power supply and without regular human monitoring (i.e. without someone to "charge" the terminal device when its power is low). This is why these types of device can be significantly impacted by the above-described relatively power intensive procedure for waking a conventional terminal device from a DRX sleep mode.

As with the smart phone 403, the MTC terminal device 405 comprises a transceiver unit 405a for transmission and reception of wireless signals and a controller unit 405b configured to control the MTC terminal device 405. The controller unit 405b may comprise a processor unit which is suitably configured/programmed to provide the desired functionality described herein using conventional programming/configuration techniques for equipment in wireless telecommunications systems. For example, the functionality of the controller unit 405b may be provided by an integrated circuit according to an embodiment of the invention. The controller unit 405b may, for example, comprise various functional units associated with various functions to be performed in accordance with the principles described herein. The transceiver unit 405a and the controller unit 405b are schematically shown in FIG. 4 as separate elements for ease of representation. However, it will be appreciated that the functionality of these units can be provided in various different ways following established practices in the art, for example using a single suitably programmed integrated circuit. It will be appreciated the MTC terminal device 405 will in general comprise various other elements associated with its operating functionality which are not shown here in the interests of simplicity (for example, the MTC terminal device 405 may further comprise a user interface and so forth).

The base station 402 comprises a transceiver unit 402a for transmission and reception of wireless signals and a controller unit 402b configured to control the base station 402. The controller unit 402b may comprise a processor unit which is suitably configured/programmed to provide the desired functionality described herein using conventional programming/configuration techniques for equipment in wireless telecommunications systems. The transceiver unit 402a and the controller unit 402b are schematically shown in FIG. 4 as separate elements for ease of representation. However, it will be appreciated that the functionality of these units can be provided in various different ways following established practices in the art, for example using a single suitably programmed integrated circuit. It will be appreciated the base station 402 will in general comprise various other elements associated with its operating functionality.

Thus, the base station 402 is configured to communicate data with the smart phone 403 over a first radio communication link 404 and communicate data with the MTC terminal device 405 over a second radio communication link 406.

It is assumed here the base station 402 is configured to communicate with the smart phone 403 over the first radio communication link 404 in accordance with the established principles of LTE-based communications.

To communicate terminal-device specific data between the base station 402 and the conventional smart phone terminal device 403, the smart phone 403 first synchronises with the base station 402 in accordance with the above-described techniques. The base station 402 may then communicate data intended for the smart phone 403 in a synchronous manner in accordance with established techniques.

In a conventional LTE system an MTC terminal device will typically be required to undertake a synchronisation and camp-on procedure which is similar to that of a conventional smart phone in order to communicate device-specific data with the base station. As discussed above, this can be problematic for maintaining power reserves. Accordingly, embodiments of the present invention provide an approach that allows certain types of terminal device, for example MTC terminal devices, to receive useful data without the same overheads associated with the conventional synchronisation procedure associated with other types of terminal device. Furthermore, in accordance with some embodiments of the invention this is achieved in a manner that does not impact the ability of the other types of terminal device (for example, conventionally-operating legacy terminal devices) to function in the telecommunications system without modification.

This may be achieved in accordance with some embodiments of the invention by avoiding the process of detecting and decoding the conventional synchronisation and control signalling before communicating terminal device-specific data with certain types of terminal device, such as MTC terminal devices. More specifically, in accordance with some embodiments of the invention, when a terminal device wakes to seek to receive any data that might be pending from a base station after a period of inactivity, the terminal device employs an alternative method that does not include the above-described frame synchronisation.

Thus in the wireless telecommunications system 400 shown in FIG. 4, the MTC terminal device 405 is configured to switch between a sleep mode and an awake mode based on a predetermined timing schedule. This aspect of the wireless telecommunications system may broadly follow the same principles as for the conventional DRX scheme, although it is expected that the maximum periods of inactivity may be longer than currently available for DRX, for example several minutes, hours or even days. However, on waking up in accordance with the predefined timing schedule, instead of seeking to synchronise to the frame structure transmitted by a base station in accordance with conventional techniques, the MTC terminal device 405 according to an embodiment of the invention instead starts searching for a predefined signature sequence which is transmitted by a base station according to an embodiment of the invention in association with terminal-specific data, such as user plane data for the MTC terminal device 405, or other data which is not generic control signalling.

Figure 5:
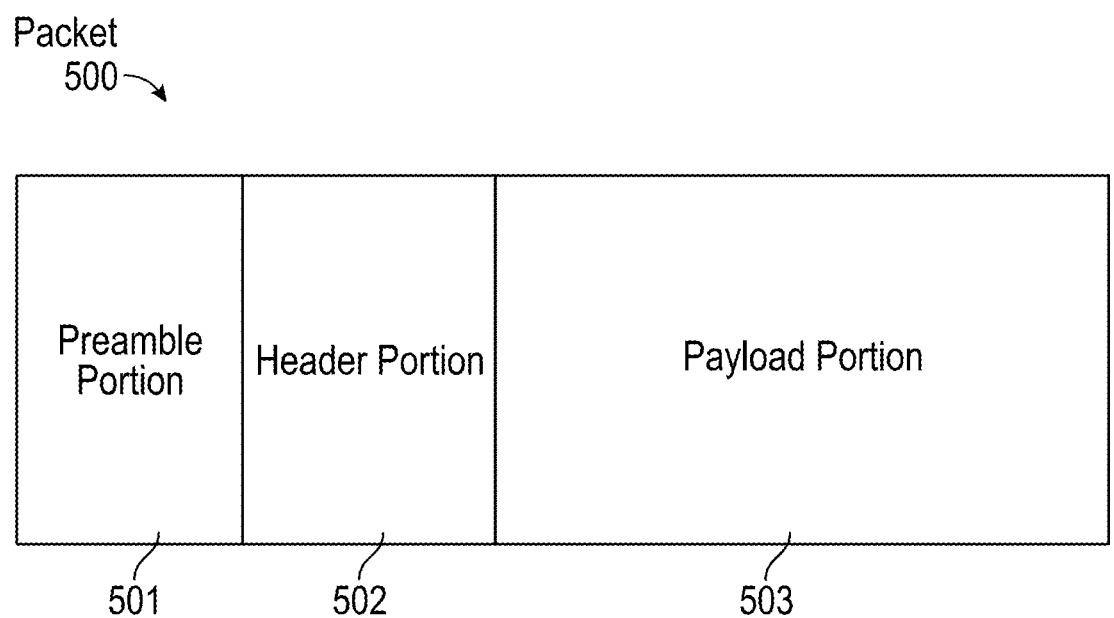
FIG. 5 is a schematic diagram illustrating downlink data in accordance with an embodiment of the present invention.

In accordance with this embodiment of the invention, the base station 402 shown in FIG. 4 is configured to transmit the predefined signature sequence in association with terminal specific data using a packet format such as schematically shown in FIG. 5. The packet 500 schematically represented in FIG. 5 comprises three main portions, namely a preamble portion 501, a header portion 502, and a payload portion 503. The packet itself may be coded in accordance with the established principles for communicating data in wireless telecommunications systems. In this example embodiment a relatively low order modulation scheme, for example QPSK, might be used to help improve reception ability across an operating cell for the base station. However, in other embodiments other modulation schemes could be used. The preamble portion 501 of the packet 500 comprises the predefined signature sequence, the header portion 502 comprises an indication of an identity of a terminal device for which terminal-device specific data is to be transmitted in the subsequent payload portion 503, and the payload portion 503 comprises the terminal-specific data.

Figure 7:
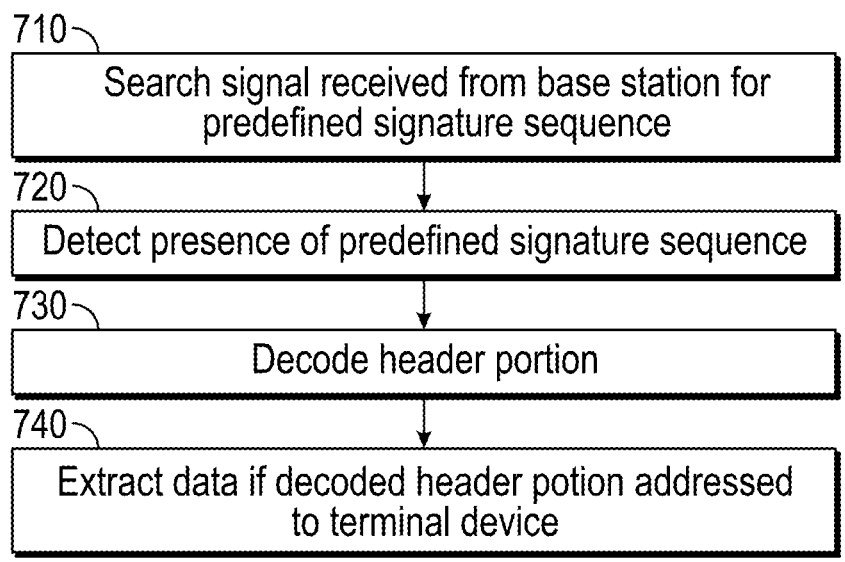
FIG. 7 is a flow chart of the operation of a terminal device in response to a signal from a base station in accordance with an embodiment of the present invention.

Thus, as shown in FIG. 7, the MTC terminal device 405 is configured to search the signal received from the base station to seek to identify the presence of the predefined signature sequence (Step 710). On detection of an occurrence of the predefined signature sequence (preamble) 501 in the signal transmitted by the base station 402 in accordance with an embodiment of the invention (Step 720), the terminal device 405 proceeds to decode the following header portion to determine whether the data is intended for itself based on the identity of the terminal device(s) indicated in the header portion (Step 730). Terminal devices may be identified in accordance with any established techniques, for example based on a conventional radio network identifier for the terminal device. The header portion 502 may be coded using a predefined coding scheme to aid decoding without any prior signalling. If a terminal device identifies from the header portion that the packet 500 comprises data addressed to the terminal device, the terminal device may then continue to decode and extract the relevant data from the payload portion 503 (Step 740). In some example implementations the payload portion might always be coded in accordance with a predefined scheme. In other implementations where the payload portion 503 may be coded differently at different times, for example using different coding rates, an indication of the relevant coding scheme may be included in the header portion to aid the terminal devices in decoding the corresponding payload portion 503. If the terminal device determines from the header portion 502 that the payload data is not intended for the terminal device, the terminal device may continue searching for other currencies of the predefined signature sequence 501 for the remainder of its awake period according to the predefined timing schedule, before returning to a sleep mode. Accordingly, when the base station 402 acquires data intended for the terminal device 405, it may be configured to buffer the data until the next (or later) time period during which the terminal device is configured to wake up and begin searching for the predefined signature sequence. When this period arrives, the base station 402 may be configured to transmit a packet having the format represented in FIG. 5 in order to communicate the data to the terminal device within the known wake-up window for the terminal device.

The base station 402 may be configured to introduce the packet 500 at an arbitrary location within the frame structure employed by the base station 402 for communicating with other terminal devices in a conventional synchronous manner, for example such as the frame structure schematically represented in FIG. 2. However, it will generally be simpler if the base station introduces the packet 500 at a location which does not significantly interfere with this frame structure. For example, it may be advantageous for the base station 402 to introduce the packet(s) 500 at times and frequencies which are outside regions for control signalling associated with other terminal devices, and are instead in regions which the base station is otherwise free to schedule as desired. In particular, it may be advantageous for the packet(s) 500 to be scheduled by the base station during regions of the frame structure used for communicating synchronously with conventional terminal devices on PDSCH, thereby avoiding interference with control signalling for other terminal devices, such as signalling associated with PSS, SSS, PBCH, PDCCH, PCFICH and/or PHICH. Accordingly, when the base station transmits a packet 500 for communicating non-synchronously with terminal devices of one type at a time and frequency corresponding to a region of PDSCH in the frame structure associated with communications with conventional terminal devices, the base station may avoid scheduling conventional terminal devices at these times and frequencies.

Thus, in broad summary of some embodiments of the invention, data for certain types of terminal device may be communicated to those terminal devices in a non-synchronous manner in a wireless telecommunications network which also supports synchronous communications for other types of terminal device. In particular, this may be done by communicating data specific to a particular terminal device in association with a predefined signature sequence transmitted by a base station, for example a preamble, which the terminal devices are configured to search for. On identifying an occurrence of the predefined signature sequence a terminal device may proceed to decode the data transmitted by the base station in association with the signature sequence. Thus the terminal device is able to receive the data simply by detecting the predefined signature sequence in a nonsynchronous manner, thereby avoiding a process of synchronising to the frame structure of the base station transmissions.

It will be appreciated that within the context of the general principles set out above there are many different ways of implementing various aspects of a wireless telecommunications system and/or they station and/or terminal device in accordance with various embodiments of the invention, and some of these are now described.

Figure 6B:
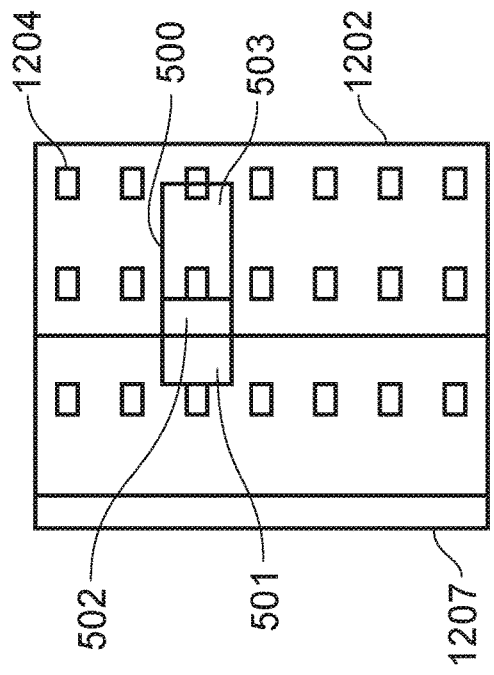
FIGS. 6A to 6D are schematic diagrams illustrating portions of an LTE downlink radio frame in accordance with some embodiments of the present invention.
Figure 6D:
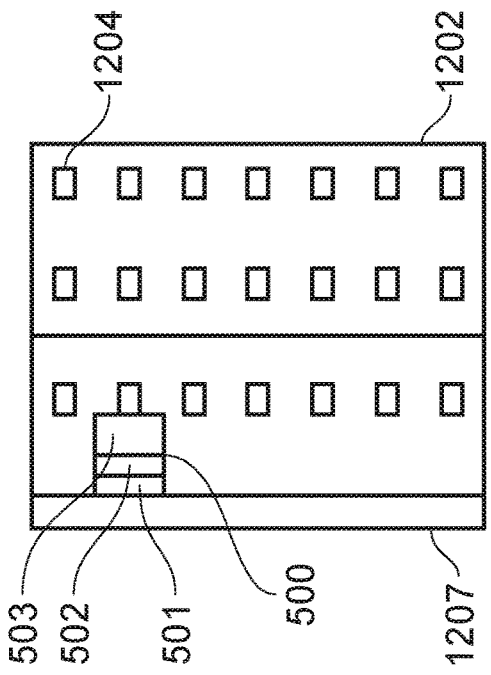
Figure 6A:
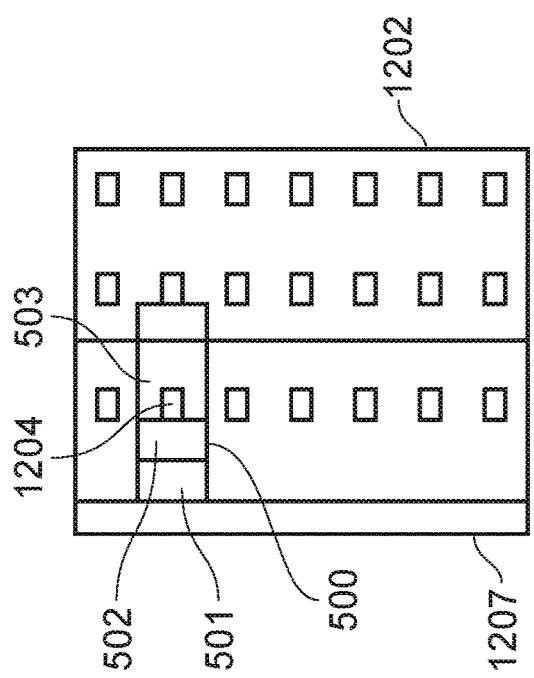

FIG. 6A schematically shows one example location for a packet 500 for communicating non-synchronously with an MTC terminal device within a conventional LTE frame structure in accordance with an embodiment of the invention. The example frame structure represented in FIG. 6A is employed by a base station for communicating synchronously with other terminal devices in a manner which is otherwise in accordance with established LTE standards. The extent of the frame structure represented in FIG. 6A corresponds with a single subframe 1202. Conventional aspects of the subframe 1202 are similar to and will be understood from the corresponding conventional aspects of the subframes 202 of the commercial LTE frame structure represented in FIG. 2. In this example, the packet 500 for communicating non-synchronously occupies a contiguous region in the time-frequency resource grid of the frame structure. The range of frequencies spanned by the packet 500 may be predefined and selected according to the implementation at hand (for example, how much data needs to be communicated for asynchronously-operating devices). For example, a width of 1.4 MHz might be used.

The location of the packet 500 in frequency space may be fixed, for example in accordance with a defined standard or through prior negotiation between the base station and a terminal device configured to operate in accordance with an embodiment of the invention. For example, a frequency band within the overall carrier bandwidth for use for non-synchronous communication in accordance with embodiments of the invention may be established during an initial camp on procedure or through dedicated signalling. Thus, where transmission of non-synchronous communications are restricted to a limited bandwidth within the overall carrier bandwidth, a terminal device searching for the predefined signature sequence need only scan within the predefined restricted frequency range. However, in other examples, a packet bearing data to be transmitted non-synchronously may be inserted into the frame structure by the base station at any frequency. In this case terminal devices searching for the predefined signature sequence may search the entire frequency space. In some cases, the base station may be configured to update the terminal devices on the potential locations of future predefined signature sequence transmissions (e.g. in terms of particular frequency ranges), thereby simplifying the process of searching. For example, this may be communicated in a header portion of a packet 500 of the kind discussed above.

The location of the packing 500 in time may be arbitrarily selected by the base station. This is because the terminal device searching for the packet 500 is not synchronised to the frame structure and so it does not matter to the terminal device when the packet is transmitted relative to the existing LTE frame structure used for communicating with other terminal devices. However, the base station may be configured to insert the non-synchronous communications in a way which minimises any impact on communications with conventional LTE terminal devices within the existing frame structure.

Thus, in the example shown in FIG. 6A, the packet 500 is inserted by the base station outside of the times and frequencies corresponding to a control region 1207 (PDCCH) associated with the LTE frame structure. In the example of FIG. 6A the asynchronous communications packet 500 is inserted by the base station into the existing LTE frame structure in symbols occurring immediately after the control region 1207. Thus the base station is operable to synchronise the packet to a selected location in the existing LTE frame structure which is outside the control region use for communicating control data to other conventional devices in order to minimise any impact on these other devices. However, as noted above terminal devices searching for the packet 500 may not be aware that it has any particular synchronisation to the frame structure. On the contrary, these terminal devices simply search for the existence of the predefined signature sequence anywhere within the signal transmitted by the base station. (The process of searching for the predefined sequence may be performed in accordance with any known techniques, for example using similar techniques to those currently used for identifying the PSS and SSS signalling)

As represented in FIG. 6A, the extent of the asynchronous communication packet 500 in the LTE frame structure encompasses one of the conventional LTE reference symbols 1204. In particular, the payload data portion 503 encompasses one of the reference symbols 1204. In this case, the base station may simply transmit data specific to the terminal device(s) receiving the packet (e.g. based on identification information in the header portion 502 as discussed above) in place of the reference symbols. This will cause conventional LTE devices expecting to see the reference symbol to conclude there was an error in transmission and react accordingly (e.g. by ignoring the reference symbol and interpolating from other reference symbols). Alternatively, the base station may be configured to transmit the reference symbol 1204 occurring within the payload data portion of the packet 500 in the usual way. In this case the terminal device(s) asynchronously receiving the packet 500 might be configured to ignore this portion of the payload data. This may be based, for example, on ensuring that any reference symbols encompassed by the packet 500 occur at a predefined location in the payload data/packet, or at locations which are signalled to the terminal device in the header portion 502 to indicate which parts of the payload data region 503 the terminal device should ignore. In principle the extent of the packet may be sufficient to span more than one subframe. In this case, the packet will overlap a PDCCH region of at least one subframe. The terminal device may be provided with an indication of the location of the PDCCH symbols that are overlapped to avoid the terminal device attempting to decode these regions.

Thus, as described above, a terminal device according to an embodiment of the invention, such as the MTC device 405 schematically represented in FIG. 4, is configured to awake from a sleep mode and begin searching for the predefined signature sequence, the searching process may continue until a specified event, for example the expiration of the terminal device's wake-up window or the successful reception of device-specific data. On identifying the signature sequence 501 transmitted from the base station, the MTC device 405 proceeds to decode the immediately following header portion 502. As discussed above, the header portion 502 may contain information relating to the identity of the terminal device with which the base station is seeking to communicate device-specific data to and information on the coding scheme used for the device-specific data in the following payload portion 503. If the terminal device determines from the header portion 502 that the payload data 503 is intended for itself, it will proceed to decode the following payload portion 503 so as to extract the relevant data.

In some cases the device-specific information which the base station wishes to communicate may be intended for only a single terminal device, in which case the header portion 502 may comprise an indication of an identity that is unique to that device. In other situations, the terminal-device specific information may be specific to a class of terminal devices. For example, the terminal-device specific information may comprise price update information for communicating to a plurality of MTC devices acting as smart-meters in a consumer's home. In such cases the header portion 502 may include an identifier for a group of devices, for example a broadcast address, such that devices which are members of the group are able to identify the packet has been intended for themselves. This allows for simultaneous non-synchronous communication between a base station and a plurality of devices. Furthermore, it will be appreciated that while FIG. 6A shows only a single non-synchronous communication packet 500 for the sake of simplicity, in other examples where a base station is to non-synchronously communicate different data to a plurality of different terminal devices there may be multiple instances of nonsynchronous communications packets of the kind shown in FIG. 6A inserted in a single subframe.

It will be appreciated that in some implementations the predefined signature sequence itself may provide the relevant identifier for the terminal device to which the data is intended. For example, each individual terminal device may be associated with a specific predefined signature sequence so that if the terminal device identifies its signature sequence it knows the subsequent data is intended for the terminal device. In practice this is unlikely to be an optimum approach where there are a large number of terminal devices which might asynchronously receive data because of the correspondingly large number of predefined signature sequences that would need to be defined. However, where terminal devices may be classified into groups (for example, all smart meters owned by a certain provider), a dedicated signature sequence may be used to address this group. This would avoid the need for including any identity information in a header portion. Furthermore, if the payload data is transmitted in association with the predefined signature sequence using a predefined coding scheme, there would be very little information needed by the terminal devices to allow them to decode the payload data once they have identified the predefined signature sequence. Thus, a header portion might not be employed.

Figure 6C:
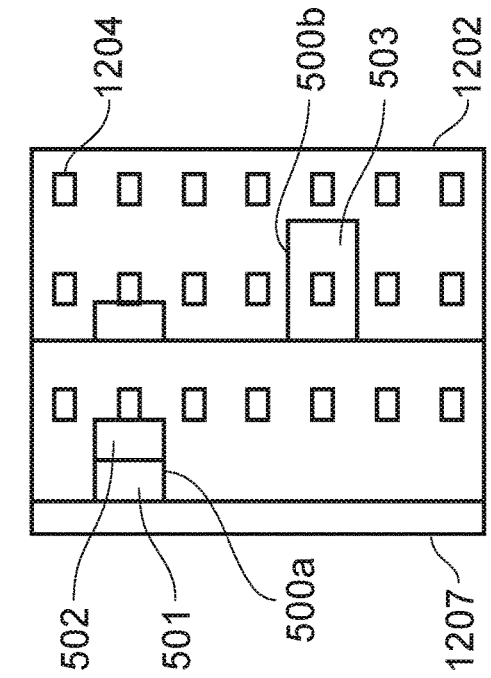

FIGS. 6B, 6C and 6D schematically shows other example locations for a packet 500 for communicating non-synchronously with MTC terminal devices within a conventional LTE frame structure in accordance with an embodiment of the invention. These figures are similar to, and will be understood from the corresponding description of FIG. 6A discussed above.

FIG. 6B differs from FIG. 6A in that it shows the packet 500 being transmitted at a different portion of the subframe 1207. In the example shown in FIG. 6B, the non-synchronous communications packet 500 is schematically shown being inserted into the LTE frame by the base station at an arbitrary time which is not synchronised with the existing LTE frame structure. Whilst this approach is in principle possible, it can potentially complicate the scheduling requirements for the base station and so may not be a preferred approach in practice.

FIG. 6C differs from FIG. 6A in that the packet 500 is not transmitted in a contiguous block. In the example shown in FIG. 6C, the predefined signature sequence (preamble portion) 501 and header portion 502 are broadcast at broadly the same locations as shown in FIG. 6A. However, the payload portion 503 is transmitted at a time and frequency that is not contiguous with the header portion 502. The location of the payload portion 503 relative to the header portion 502 may be indicated in the header portion 502 or predefined/pre-established. This approach provides more flexibility on where the base station can insert the signalling associated with non-synchronous communications but at the cost of increased complexity.

FIG. 6D differs from FIG. 6A in that the packet 500 is of a shorter duration and does not overlap with any reference symbols of the existing LTE frame structure, thereby simplifying the decoding process.

It will be appreciated that a base station might only insert packets corresponding to packet 500 for non-synchronous communication with terminal devices in subframes where there are data that the base station wishes to communicate to terminal devices in a nonsynchronous manner and where the base station is aware recipient terminal device will not be in a sleep mode, e.g. based on a predefined/pre-negotiated timing schedule as discussed above. In examples where the base station is aware of the wake-up periods for the terminal device with which it wishes to communicate asynchronously, it may be configured to avoid transmitting the data at times which are close to the opening/closing of the terminal devices wake-up window. This is to allow for drifts in the clock of the terminal device relative to the base station which might cause the terminal device to wake slightly before or after the base station's understanding of when the awake window is occurring.

In some embodiments a base station may not be aware of the sleep/wake cycle for a terminal device with which the base station wishes to non-synchronously communicate data in accordance with an embodiment of the invention. In this situation a base station may be configured to simply attempt to communicate the data at a selected time and rely on acknowledgement signalling from the terminal device to indicate whether or not the data has been successfully received, for example based around existing HARQ techniques. Thus, if the base station transmits the relevant data during a time when the terminal devices in a sleep mode, the base station will not receive an acknowledgement, and may attempt retransmission at a later time. If, on the other hand, the base station transmits the relevant data during a time when the terminal device is awake and searching for the predefined signature sequence and the terminal device successfully receives the data, the terminal device may be configured to transmit acknowledgement signalling to the base station to indicate this. The acknowledgment signalling may be transmitted by the terminal device at a predefined temporal offset relative to the time the packet to be acknowledged was received. This allows the terminal device to in effect send acknowledgment signalling which is synchronised to the frame structure (i.e. by using timing relative to the receipt of the predefined signature sequence which is itself synchronised to the frame structure by base station driven scheduling).

Whiles acknowledgment signalling may be helpful in some circumstances, in some cases where acknowledgment signalling might in principle be helpful, it might not be utilised in order to reduce two-way communications between the base station and the terminal device. In this situation the base station might use other methods to increase the chance of the terminal device successfully receiving data, for example employing routine retransmissions. However, in practice this approach may not be desirable because the base station may not be able to establish to adequate degree of certainty the success of a transmission.

In accordance with embodiments of the invention, a base station may communicate with a terminal device only relatively infrequently, for example based on the terminal devices sleep/wake cycle. It is therefore possible for a base station to accrue multiple messages that needs to be communicated to the terminal device. Accordingly, the base station may buffer these for transmission in a single payload portion (to the extent the available payload portion is large enough).

In accordance with the embodiment of the invention discussed above, the predefined signature sequence comprises a preamble of a non-synchronous communications packet 500. However, in other examples it will be appreciated that other forms of predefined signature sequence may be employed. For example, the predefined signature sequence may comprise a mid-amble or post amble of a packet. The predefined signature sequence may also comprise a different form of pilot signal, for example spanning a limited frequency range for the entire duration of a non-synchronous transmission, or scattered throughout a non-synchronous transmission. A terminal device identifying such a pilot signal may be configured to decode associated data based on a predefined/pre-negotiated relationship between the presence and location of the pilot signal and surrounding time/frequency resources, for example.

Thus to summarise some embodiments of the invention, there is provided a wireless telecommunications system comprising a base station, a first terminal device and a second terminal device, wherein the first terminal device is a terminal device of a first type and the second terminal device is a terminal device of a second type, the second type being different from the first type, and wherein the at least one base station is configured to communicate data which is specific to the first terminal device in a synchronous manner and to communicate data which is specific to the second terminal device in a non-synchronous manner. Embodiments of the invention also provide for a base station and a terminal device of the second type configured to operate in the wireless telecommunications system.

The device-specific data may include an identifier for the second terminal device. In some examples a terminal device may be configured on receipt of device-specific data comprising an identifier for the terminal device to undergo a conventional synchronisation procedure to receive further data, for example user plane data, in a synchronous manner. That is to say, the principles underlying the above-described technique for communicating asynchronously with certain types of terminal device may be employed to communicate an indication to a given terminal device that it should synchronise with the base station transmissions in order to allow synchronous reception of data, for example in accordance with conventional LTE communication techniques. Thus in this operating mode the terminal device still synchronises with the network, but only after it has already been informed asynchronously that it should do so. Accordingly, by having the base station transmit a predefined signature sequence in association with device-specific data comprising a device-specific identifier, the base station can in effect instruct the terminal device to synchronise to the frame structure such that further data can be subsequently transmitted in a conventional synchronous manner. Accordingly, with this approach the terminal device is relieved of the task of synchronising with the network on every wake-up just to see if there are any data available for it. Instead, the terminal devices is first provided with an asynchronous indication that data are actually waiting for the terminal device, thereby helping to avoid the terminal devices synchronising with the base station when there are no data to be received.

Alternatively, and as described above with reference to the payload data, the device specific data may comprise user-plane data which the base station wishes to communicate to the device so that the terminal devices able to receive the user plane data without having to synchronise to the base station at all. This may be most appropriate when there will typically only be relatively small amounts of data to be transmitted to the terminal device. Where it is expected that larger amounts of data will be sporadically transmitted to the device, an approach in which the device-specific data comprises an instruction informing the terminal device to synchronise to receive further data may be preferred.

In a wireless telecommunications system according to an embodiment of the invention, a plurality of predefined signature sequences may be defined for use for asynchronously transmitting data in the manner described above. Each terminal device configured to receive data asynchronously may be configured to search for any of, or any of a subset of, these predefined signature sequences.

It will be appreciated that various modifications can be made to the embodiments described above without departing from the scope of the present invention as defined in the appended claims. In particular although embodiments of the invention have been described primarily with reference to an LTE-based telecommunications system/mobile radio network, it will be appreciated that the present invention can be applied to other forms of network such as GSM, 3G/UMTS, CDMA2000, etc., where similar issues can arise.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and To Skala A, "*LTE for UMTS OFDMA and SC-FDMA based radio access*", John Wiley and Sons, 2009.
[2] ETSI TS 122 368 V10.530 (2011-07)/3GPP TS 22.368 version 10.5.0 Release 10)

The invention claimed is:

1. A terminal device for communicating with a base station in a wireless telecommunications system, the terminal device comprising:
    circuitry configured to:
    receive a radio frame transmitted by the base station in a non-synchronous manner in which the terminal device is not synchronized to a radio frame structure transmitted by the base station, the radio frame having a packet inserted by the base station outside of a control region including a physical downlink control channel (PDCCH) of the radio frame, the packet including a predefined signature sequence, a header portion and a payload portion, the header portion including an indication of an identity of an intended recipient terminal device, wherein the identity of the intended recipient terminal device comprises an identifier of a group of devices specific to a class of Machine Type Communication (MTC) terminal devices including the intended recipient terminal device, and the payload portion including data specific to the intended recipient terminal device;
    search the radio frame for the predefined signature sequence only during time periods determined in accordance with a predefined timing schedule;
    detect the predefined signature sequence within the radio frame; and
    in response to detection of the predefined signature sequence within the radio frame:
        extract the data from the payload portion included in the packet in the radio frame in a case that the indication indicates that the terminal device is the intended recipient terminal device; and
        continue to search the radio frame for other occurrences of the predefined signature sequence in a case that the indication indicates that the terminal device is not the intended recipient terminal device,
        wherein in the case that the indication indicates that the terminal device is not the intended recipient terminal device, the circuitry continues to search the radio frame for other occurrences of the predefined signature sequence in a remainder of a wake period according to the predefined timing schedule before returning to a sleep mode.

2. The terminal device of claim 1, wherein the circuitry is further configured to enter the sleep mode at times outside of the time periods during which it searches for the predefined signature sequence.

3. The terminal device of claim 1, wherein the circuitry is further configured to enter the sleep mode in response to receiving the data specific to the terminal device.

4. The terminal device of claim 1, wherein the circuitry is further configured to search for the predefined signature sequence within a predefined frequency range which is narrower than and within an operating frequency range of the wireless telecommunications system.

5. The terminal device of claim 1, wherein the data specific to the terminal device comprises user-plane data for the terminal device.

6. The terminal device of claim 5, wherein the data specific to the terminal device comprises an indication of a coding scheme for the user-plane data for the terminal device.

7. The terminal device of claim 1, wherein the data specific to the terminal device comprises an indication of a time and/or frequency on which user-plane data for the terminal device is transmitted by the base station.

8. The terminal device of claim 1, wherein the predefined signature sequence included in the packet comprises a portion selected from a group comprising a pre-amble portion, a mid-amble portion, a post-amble portion, a pilot portion, and a scattered pilot portion.

9. The wireless telecommunications system of claim 1, wherein the packet further comprises an indication of resources encompassed by the payload portion of the packet that are not used to convey other data specific to a second terminal device.

10. The terminal device of claim 1, wherein the predefined signature sequence is any one of a set of predefined signature sequences for which the terminal device is configured to search.

11. The terminal device of claim 1, wherein the circuitry is further configured to transmit acknowledgement signalling to the base station after successful receipt of the data specific to the terminal device.

12. The terminal device of claim 11, wherein the circuitry is further configured to transmit the acknowledgement signalling a predefined time after receiving the predefined signature sequence.

13. The terminal device of claim 1, wherein
    the data specific to the terminal device comprises an instruction for the terminal device to proceed to synchronize to the frame structure transmitted by the base station in order to receive further data in a synchronous manner, and the terminal device is configured to synchronize to the frame structure in response to receiving the instruction.

14. The terminal device of claim 1, wherein the circuitry is further configured to receive data from the base station in a synchronous manner.

15. The terminal device of claim 1, wherein the packet is inserted by the base station into an existing Long Term Evolution (LTE) frame structure in symbols occurring immediately after the PDCCH.

16. The terminal device of claim 1, wherein the payload portion is transmitted by the base station at a time and a frequency that is not contiguous with the header portion.

17. A method of operating a terminal device in a wireless telecommunications system, the method comprising:
   receiving a radio frame transmitted by a base station in a non-synchronous manner in which the terminal device is not synchronized to a radio frame structure transmitted by the base station, the radio frame having a packet inserted by the base station outside of a control region including a physical downlink control channel (PDCCH) of the radio frame, the packet including a predefined signature sequence, a header portion and a payload portion, the header portion including an indication of an identity of an intended recipient terminal device, wherein the identity of the intended recipient terminal device comprises an identifier of a group of devices specific to a class of Machine Type Communication (MTC) terminal devices including the intended recipient terminal device, and the payload portion including data specific to the intended recipient terminal device;
   searching the radio frame for the predefined signature sequence only during time periods determined in accordance with a predefined timing schedule;
   detecting the predefined signature sequence within the radio frame; and
   in response to detecting the predefined signature sequence within the radio frame:
      extracting the data from the payload portion included in the packet in the radio frame in a case that the indication indicates that the terminal device is the intended recipient terminal device; and
      continuing to search the radio frame for other occurrences of the predefined signature sequence in a case that the indication indicates that the terminal device is not the intended recipient terminal device,
      wherein in the case that the indication indicates that the terminal device is not the intended recipient terminal device, the circuitry continues to search the radio frame for other occurrences of the predefined signature sequence in a remainder of a wake period according to the predefined timing schedule before returning to a sleep mode.

18. An integrated circuit for use in a terminal device for communicating with a base station in a wireless telecommunications system, wherein the integrated circuit comprises circuitry for causing the terminal device to:
   receive a radio frame transmitted by the base station in a non-synchronous manner in which the terminal device is not synchronized to a radio frame structure transmitted by the base station, the radio frame having a packet inserted by the base station outside of a control region including a physical downlink control channel (PDCCH) of the radio frame, the packet including a predefined signature sequence, a header portion and a payload portion, the header portion including an indication of an identity of an intended recipient terminal device, wherein the identity of the intended recipient terminal device comprises an identifier of a group of devices specific to a class of Machine Type Communication (MTC) terminal devices including the intended recipient terminal device, and the payload portion including data specific to the intended recipient terminal device;
   search the radio frame for the predefined signature sequence only during time periods determined in accordance with a predefined timing schedule;
   detect the predefined signature sequence within the radio frame; and
   in response to detection of the predefined signature sequence within the radio frame:
      extract the data from the payload portion included in the packet in the radio frame in a case that the indication indicates that the terminal device is the intended recipient terminal device; and
      continue to search the radio frame for other occurrences of the predefined signature sequence in a case that the indication indicates that the terminal device is not the intended recipient terminal device,
      wherein in the case that the indication indicates that the terminal device is not the intended recipient terminal device, the circuitry continues to search the radio frame for other occurrences of the predefined signature sequence in a remainder of a wake period according to the predefined timing schedule before returning to a sleep mode.

* * * * *